(12) United States Patent
Aguirre et al.

(10) Patent No.: US 7,217,767 B2
(45) Date of Patent: *May 15, 2007

(54) BLENDS OF POLYPROPYLENE IMPACT COPOLYMER WITH OTHER POLYMERS

(75) Inventors: Juan Jose Aguirre, League City, TX (US); Mike McLeod, Kemah, TX (US); Rodolfo Mier, Pasadena, TX (US); Nguong van Nguyen, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/885,399

(22) Filed: Jul. 6, 2004

(65) Prior Publication Data

US 2006/0009586 A1    Jan. 12, 2006

(51) Int. Cl.
  *C08L 23/04* (2006.01)
  *C08L 23/10* (2006.01)
  *C08L 23/18* (2006.01)
(52) U.S. Cl. ..................... 525/191; 525/240
(58) Field of Classification Search ............... 525/191, 525/240
  See application file for complete search history.

(56) References Cited

U.S. PATENT DOCUMENTS

| | | | |
|---|---|---|---|
| 4,354,004 A | 10/1982 | Hughes et al. | |
| 5,641,848 A | 6/1997 | Giacobbe et al. | |
| 6,072,005 A * | 6/2000 | Kobylivker et al. | 525/240 |
| 6,211,295 B1 | 4/2001 | Burgin et al. | |
| 2002/0006482 A1 | 1/2002 | Falla et al. | |
| 2003/0162458 A1 | 8/2003 | Tsujiyama et al. | |
| 2005/0234172 A1* | 10/2005 | Musgrave et al. | 524/379 |
| 2006/0008666 A1* | 1/2006 | Miller et al. | 428/523 |

FOREIGN PATENT DOCUMENTS

| | | |
|---|---|---|
| EP | 0414202 A2 | 2/1991 |
| EP | 0595252 A1 | 5/1994 |
| EP | 0474376 B1 | 5/1996 |
| WO | WO 97/20888 | 6/1997 |
| WO | WO 97/44178 | 11/1997 |

* cited by examiner

*Primary Examiner*—Nathan M. Nutter
(74) *Attorney, Agent, or Firm*—Tenley R. Krueger

(57) ABSTRACT

It has been discovered that the properties of sheet or film materials of broad molecular weight distribution ethylene/propylene rubber impact-modified heterophasic copolymer (ICP) can be improved by blending the ICP with a second polyolefin. The second polyolefin may be a syndiotactic polypropylene (sPP), a random copolymer (RCP) of propylene and comonomer (e.g. ethylene and/or butene) made using a Ziegler-Natta or metallocene catalyst, medium density polyethylene (MDPE), linear low density polyethylene (LLDPE), or low crystalline copolymer of propylene/$\alpha$-olefin. Improvements include, but are not necessarily limited to, reduced motor amps, lower secant modulus, increased dart drop strength, increased gloss, reduced haze, increased elongation to yield, elimination of stress whitening, improved puncture resistance, and decreased seal initiation temperature. This sheet of film materials may be co-extruded with other resins or laminated with other materials after extrusion.

22 Claims, 8 Drawing Sheets

FIG. 1

Processing Pressures for 4180, 4280 and the Selected Blends of Table 4

NOTE: Numbers within the Figure are the pressures for neat 4180 and 4280.

FIG. 2

Processing Amps for 4180, 4280, 4280W and the Selected Blends of Table 4

NOTE: Numbers within the Figure are the amps for the neat resins.

FIG. 3

Tear Strength of 4180 and 4180 with 15% of the Indicated Resin Modifiers

FIG. 4

1% Secant Modulus of 4180 and 4180 with Indicated 15% Resin Modifiers

FIG. 5

Maximum Tensile Strength of 4180 and 4180 with 15% Resin Modifiers

FIG. 6

Elongation at Yield for 4180 and 4180 with 15% Resin Modifiers

FIG. 7

Extrusion Pressures on Alpine Extruder for Neat 4180, Neat HL 328 and Blends Thereof

| | 100% 4180 | 25% HL 328 / 75% 4180 | 50% HL 328 / 50% 4180 | 75% HL 328 / 25% 4180 | 100% HL 328 |
|---|---|---|---|---|---|
| ■ Pressure Before Screen Pack (psig) | 3850 | 4020 | 4020 | 4260 | 4590 |
| □ Pressure After Screen Pack (psig) | 2580 | 2470 | 2630 | 2790 | 2960 |

■ Pressure Before Screen Pack (psig)   □ Pressure After Screen Pack (psig)

FIG. 8

Puncture Resistance of 2.0 mil Films for Neat 4180, Neat HL 328 and Blends Thereof

Puncture Resistance

| | 100% HL 328 | 75% HL 328 / 25% 4180 | 50% HL 328 / 50% 4180 | 25% HL 328 / 75% 4180 | 100% 4180 |
|---|---|---|---|---|---|
| ▫ Force at Break (lbf) | 3.53 | 3.9 | 4.46 | 4.77 | 5.25 |
| ■ Maximum Load (lbf) | 3.85 | 4.28 | 4.85 | 5.15 | 5.82 |
| ■ Total Energy (lb.in) | 1.595 | 1.899 | 2.345 | 2.588 | 3.707 |
| ▨ Elongation at Break (in) | 0.66 | 0.71 | 0.76 | 0.8 | 0.96 |

FIG. 9

Secant Modulus of 2.0 mil Films for Neat 4180, Neat HL 328 and Blends Thereof

FIG. 10

Tensile Strength of 2.0 mil Films for Neat 4180, Neat HL 328 and Blends Thereof

FIG. 11

Tensile Elongation Results of 2.0 mil Films for Neat 4180, Neat HL 328 and Blends Thereof

FIG. 12

Machine and Transverse Direction Tear Resistance of 2.0 mil Films for Neat 4180, Neat HL 328 and Blends

FIG. 13

TD/MD Tear Ratios of 2.0 mil Films for Neat 4180, Neat HL 328 and Blends

FIG. 14

Heat Seal Results of 2.0 mil Films for Neat 4180, Neat HL 328 and Blends

FIG. 15

Seal Initiation Temperatures of 2.0 mil Films for Neat 4180, Neat HL 328 and Blends

FIG. 16

First Melt DSC Curve for 50% HL 328/50% 4180 Film

BLENDS OF POLYPROPYLENE IMPACT COPOLYMER WITH OTHER POLYMERS

FIELD OF THE INVENTION

The present invention is related to methods and compositions useful to improve the manufacture of sheets or blown films containing polypropylene. It relates more particularly to methods for making blends of impact copolymers also known as heterophasic copolymers with other copolymers to improve the characteristics thereof, as well as the resulting film and sheet materials.

BACKGROUND OF THE INVENTION

Among the different possible ways to convert polymers into films, the blown film process with air-cooling is probably the most economical and also the most widely used. This is because films obtained by blowing have a tubular shape which makes them particularly advantageous in the production of bags for a wide variety of uses (e.g. bags for urban refuse, bags used in the storage of industrial materials, for frozen foods, carrier bags, etc.) as the tubular structure enables the number of welding joints required for formation of the bag to be reduced when compared with the use of flat films, with consequent simplification of the process. Moreover, the versatility of the blown-film technique makes it possible, simply by varying the air-insufflation parameters, to obtain tubular films of various sizes, therefore avoiding having to trim the films down to the appropriate size as is necessary in the technique of extrusion through a flat head.

To date the application of polypropylene (PP) for blown film technology has been restricted to niche applications or technologies, such as PP blown film process with water contact cooling ring for highly transparent packaging film and PP used as sealing or temperature resistance layer in multilayer structures. Recently, blown film producers are showing more interest developing new structures with polypropylene. Polypropylene is expected to offer some advantages (e.g. heat resistance, puncture resistance, downgauge) compared to polyethylene. It has been seen that impact copolymers (or heterophasic copolymers) with low melt flow rate, such as ATOFINA PP 4180 polypropylene, have high melt strength and good mechanical properties that enable blown extrusion in mono-layer structures with good bubble stability.

Some resin suppliers have patents relating to monolayer and multilayer structures made using impact copolymers. Several applications are mentioned including industrial bags, bags for frozen foods, carrier bags, heavy-duty shipping sacks, among others. There is a constant need for materials having improved properties for particular applications.

It would be desirable if methods could be devised or discovered to provide polypropylene film or sheet materials having improved properties.

SUMMARY OF THE INVENTION

There is provided, in one form, a film or sheet material from a blend of at least one broad molecular weight distribution ethylene/propylene rubber impact-modified heterophasic copolymer (ICP), and from about 5 to about 95 wt % of at least one second polyolefin. The second polyolefin may be a syndiotactic polypropylene (sPP), a random copolymer (RCP) of propylene and comonomer selected from the group consisting of ethylene and butenes, made using a Ziegler-Natta catalyst (ZNRCP) or metallocene catalyst (mRCP), a medium density polyethylene (MDPE), a linear low density polyethylene (LLDPE), and/or a low crystalline copolymer of propylene/α-olefin.

In another embodiment of the invention, there is provided an impact copolymer resin blend having at least one broad molecular weight distribution ethylene/propylene rubber impact-modified heterophasic copolymer (ICP), and from about 5 to about 95 wt % of at least one second polyolefin. The second polyolefin can be a sPP, a ZNRCP or a mRCP, a MDPE, a LLDPE, and/or a low crystalline copolymer of propylene/α-olefin.

In yet another embodiment of the invention, there is provided a process for making a blown film that includes blending at least one broad molecular weight distribution ethylene/propylene rubber impact-modified heterophasic copolymer (ICP) with from about 5 to about 95 wt % of at least one second polyolefin. The second polyolefin may be a sPP, a ZNRCP or a mRCP, a MDPE, a LLDPE, and/or a low crystalline copolymer of propylene/α-olefin. The process further involves feeding the polymer blend to an extruder. The polymer blend is extruded through an annular die to form a molten tube, and the tube is blown into a bubble using air to form a blown film structure.

In further embodiments of the invention, the resin blends herein are co-extruded with other resins for form a multilayer film or sheet material. Additionally, film or sheet materials made from the resin blends of this invention may be laminated to a second sheet or film material to make a laminated article.

DETAILED DESCRIPTION OF THE INVENTION

It has been discovered that broad molecular weight distribution ethylene/propylene rubber impact-modified heterophasic copolymers (ICPs) such as ATOFINA's 4180 polypropylene can be advantageously blended with other polyolefins to give blown films and sheet materials having improved properties. Several different blends involving 4180 polypropylene mixed with other, second polyolefins include, but are not necessarily limited to, syndiotactic polypropylene (sPP), low crystalline copolymer of propylene/α-olefin (e.g. Tafmer), metallocene random copolymers, Ziegler-Natta random copolymers, medium density polyethylene, etc. that improve or change properties including, but not necessarily limited to, reduced motor amperes, lower secant modulus, improved dart drop strength, improved visual properties, improved tear properties, improved heat seal and other improved physical and mechanical properties. These studies will help to develop expertise in blown film that will support polyethylene and polypropylene businesses and result in novel blends and film and sheet materials. It has been surprisingly found that polypropylene works synergistically in some structures with polyethylene.

The broad molecular weight distribution ethylene/propylene rubber impact-modified heterophasic copolymer (ICP) that is modified with a second polyolefin in the context of this invention may be one having a polydispersity from about 4 to about 12, a melt flow rate from about 0.5 to about 5.0 dg/min, and xylene solubles of 25% or less. Impact copolymers falling within this definition include, but are not necessarily limited to ATOFINA's 4180, 4280 and 4280W polypropylene. In one non-limiting embodiment of the invention, the ICP may have a polydispersity from about 5 to about 10, a melt flow rate from about 0.5 to about 2.5 dg/min, and xylene solubles of 25% or less. In an alternate non-limiting embodiment of the invention, the xylene solubles may range from about 10 to 25 wt %, and in another alternative from about 15 to 25 wt %. In another non-limiting embodiment, the impact copolymer may have a melting point ranging from about 155 to about 170° C. and a 1% secant modulus of from about 100 to about 225 kpsi. In an alternate non-limiting embodiment, the impact copolymer may have a melting point ranging from about 158 to about 166° C. and a 1% secant modulus of from about 100 to about 175 kpsi. The density of the impact copolymer may range from about 0.89 to about 0.92 gr/cm³ in one non-limiting embodiment, and from about 0.9 to 0.91 gr/cm³ in an alternate embodiment. And in still another non-limiting embodiment the ethylene content of the impact copolymer may range from about 7 to about 15 wt %, and alternatively from about 9 to about 14 wt %. Methods for making ICPs are well known in the art, for instance, in one non-limiting embodiment methods and techniques as described in U.S. Pat. No. 6,657,024, incorporated herein by reference, may be used.

The impact copolymer may be blended with from about 5 to about 95 wt % of a second polyolefin, and in another non-limiting embodiment is blended with about 10 to about 90 wt % of the second polyolefin. In an alternate non-limiting embodiment, from about 10 to about 20 wt % of the second polyolefin is used. All of these proportions are based on the total amount of the overall blend.

One of the polyolefins that can be advantageously blended with ICP is syndiotactic polypropylene or sPP. Syndiotactic polypropylene is a stereospecific polymer that has a defined arrangement of molecules in space. Syndiotactic propylene polymers are typically described as having the methyl groups attached to the tertiary carbon atoms of successive monomeric units on the alternating side of a hypothetical plane through the main chain of the polymer, e.g., the methyl groups alternate being above or below the plane. As noted previously, stereo-specificity can be determined by the choice of external electron donor to the catalyst. Suitable sPPs for this invention are those having a melt flow rate from about 0.5 to about 100 dg/min dg/min, a melting point of about 90° C. to about 155° C. and a 1% secant modulus from about 5 kpsi to about 150 kpsi. In another non-limiting embodiment of the invention, the sPP has a melt flow rate from about 0.5 to about 25 dg/min, a melting point of about 105° C. to about 140° C. and a 1% secant modulus from about 30 kpsi to about 100 kpsi.

In another non-limiting embodiment of the invention, the polydispersity of the sPP may be less than about 5.5, and in an alternative non-limiting embodiment may range from about 2.0 to about 5.0. The Mz/Mw ratio may be less than about 3.5 for the sPP, or alternatively from about 1.7 to about 3.0 in an alternate non-limiting embodiment. The density of the sPP in one non-limiting embodiment of the invention may range from about 0.88 to about 0.92 gr/cm³, and alternatively range from about 0.89 to about 0.90 gr/cm³. Further, the xylene solubles content of the sPP may be less than about 14 wt % in one non-limiting embodiment, and alternatively less than about 12 wt %.

Another polyolefin useful for blending with ICP are random copolymers (RCPS) of propylene and a comonomer selected from the group consisting of ethylene, butenes, and larger α-olefins that are polymerized with propylene using Ziegler-Natta or metallocene catalysts. As defined herein the larger α-olefins have from 5 to 18 carbon atoms. The Ziegler-Natta catalysts may typically be those already described. With respect to the metallocene random copolymers, this term denotes polymers obtained by copolymerizing ethylene and an α-olefin, such as propylene, butene, hexene or octene, in the presence of a monosite catalyst generally consisting of an atom of a metal which may, for example, be zirconium or titanium, and of two cyclic alkyl molecules bonded to the metal. More specifically, the metallocene catalysts are usually composed of two cyclopentadiene-type rings bonded to the metal. These catalysts are often used with aluminoxanes as cocatalysts or activators, preferably methylaluminoxane (MAO). Hafnium may also be used as a metal to which the cyclopentadiene is bound. Other metallocenes may include transition metals of groups IV A, V A and VI A. Metals of the lanthanide series may also be used.

These metallocene RCPs may also be characterized by their $M_w/M_n$ ratio (polydispersity) of <4, alternatively <3.5, otherwise <3, in various non-limiting embodiments. Furthermore, the $M_z/M_w$ ratio is <2.3, alternatively <2.15, and otherwise <2.0. In one non-limiting embodiment of the invention, the mRCP used in the blends herein has a melt flow rate of from about 0.5 to about 100 dg/min, a melting point of about 105° C. to about 158° C. and a modulus from about 10 kpsi to about 150 kpsi. In another non-limiting embodiment, the mRCP may have a melt flow rate of from about 8 to about 20 dg/min, a melting point of about 105° C. to about 120° C. and a modulus from about 30 kpsi to about 65 kpsi. Furthermore, the density of the MRCP may range from about 0.88 to about 0.92 gr/cm$^3$ in one non-limiting embodiment, and alternatively from about 0.89 to about 0.90 gr/cm$^3$. Additionally, the xylene solubles in one non-limiting embodiment may be less than about 5 wt %, and alternatively less than about 2 wt %. Further, the ethylene content may range from trace amounts to about 8 wt % in one non-limiting embodiment, and alternatively from trace amounts to about 5 wt %.

The Ziegler-Natta RCPs may also be characterized by their $M_w/M_n$ ratio (polydispersity) of from about 5.0 to about 10.0, alternatively from about 5.5 to about 8.5, in various non-limiting embodiments. Furthermore, the $M_z/M_w$ ratio may range from about 2.5 to about 5.5, and alternatively from about 3.0 to about 5.0. In one non-limiting embodiment of the invention, the ZNRCP used in the blends herein has a melt flow rate of from about 0.5 to about 100 dg/min, a melting point of about 105° C. to about 158° C. and a modulus from about 10 kpsi to about 150 kpsi. In another non-limiting embodiment, the ZNRCP may have a melt flow rate of from about 0.5 to about 30 dg/min, a melting point of about 110° C. to about 135° C. and a modulus from about 30 kpsi to about 60 kpsi. Furthermore, the density of the ZNRCP may range from about 0.88 to about 0.92 gr/cm$^3$ in one non-limiting embodiment, and alternatively from about 0.89 to about 0.90 gr/cm$^3$. Additionally, the xylene solubles in one non-limiting embodiment may be less than about 14 wt %, and alternatively less than about 12 wt %. Further, the ethylene content may range from trace amounts to about 12 wt % in one non-limiting embodiment, and alternatively from trace amounts to about 8 wt %.

In the case where the second polyolefin is medium density polyethylene, the polyethylene is made using catalysts already described and techniques already described or well known in the art. In one non-limiting embodiment, the MDPE suitable herein has a melt index ($MI_2$) of from about 0.1 dg/min to about 1 dg/min and a density of about 0.925 to about 0.939 gr/cm$^3$. In another non-limiting embodiment, the MDPE has a melt index ($MI_2$) of from about 0.23 to about 0.33 dg/min and a density of about 0.930 to about 0.937 gr/cm$^3$. The melting point of the MDPE may range from about 118 to about 135° C. in one non-limiting embodiment of the invention, and alternatively from about 120 to about 130° C. The 1% secant modulus of MDPE may range from about 30 to about 80 kpsi and alternatively from about 40 to about 70 kpsi in non-limiting embodiments. The polydispersity of the MDPE suitable for this invention may range from about 9 to about 17 in one non-limiting embodiment, and alternatively from about 11 to about 15. The Mz/Mw ratio for MDPE may range from about 10 to about 16, and alternatively from about 8 to about 14 in non-limiting embodiments.

In the case where the second polyolefin is LLDPE, the MI2 may be about 1.0 dg/min, and the density range would be 0.88 gr/cm$^3$ to 0.925 gr/cm$^3$. In a non-limiting, alternative embodiment, the density may range from about 0.88 gr/cm$^3$ to about 0.918 gr/cm$^3$. (Note that densities of 0.88 gr/cm$^3$ to 0.914 gr/cm$^3$ cover Very Low Density Polyethylene (VLDPE), which includes plastomers and elastomers.) LLDPE may have a melting point of about 119° C. in one non-limiting embodiment, and a 1% secant modulus ranging from about 20 to about 50 kpsi in another non-limiting embodiment.

Metallocene ethylene-based butene plastomers suitable as the second polyolefin in the present invention may have a MI2 of about 1.2 dg/min and/or a MI5 of 2.8 dg/min in one non-limiting embodiment. High load melt index (HLMI) for these materials may be about 16.7 dg/min and a melt index of about 103.0° C., in other non-limiting embodiments. A suitable range of 1% secant modulus may range from about 15 to about 40 kpsi for these materials, and an appropriate density may range from about 0.90 to about 0.92 gr/cm$^3$, in other non-limiting embodiments of the invention.

Low crystalline copolymers of propylene/α-olefin suitable for blending with the ICPs of the invention are copolymers of propylene with other α-olefins including ethylene, butene and other α-olefins having between 5 and 18 carbon atoms. Within the context of this invention, the low crystalline copolymers of propylene/α-olefin has a melt flow rate of from about 0.2 to about 20 dg/min, a melting point from about 80 to about 150° C. and a density of about 0.88 to about 0.92 gr/cm$^3$. These copolymers can also be made by processes already described or well known in the art. By the term "low crystalline" is meant propylene/α-olefin copolymers having a degree of crystallinity equal to or less than 40%. Degree of crystallinity is calculated by dividing the melting enthalpy for the propylene/α-olefin copolymer by the equilibrium melting enthalpy of a pure folded-chain isotactic PP crystal, which is cited in the literature as 208.3 J/g. Melting enthalpy is experimentally determined by differential scanning calorimetry (DSC) tests performed at a heating rate of 10 K/min.

These low crystalline copolymers of propylene/α-olefin are sometimes termed "butene copolymers" when butene is the α-olefin copolymerized with propylene. In another non-limiting embodiment of the invention, the melt flow rate of these copolymers may range from about 5 to about 10 dg/min, and/or the density may range from about 0.88 to about 0.92 gr/cm$^3$.

The blends of the present invention may be prepared using technologies known in the art, such as the mechanical mixing of the polyolefins using high-shear internal mixers of the Banbury type, or by mixing directly in the extruder. Although special blending equipment and techniques are acceptable within the scope of this invention, in one non-limiting embodiment the blends are made using the conventional extruders associated with blown film production lines.

The blends of the present invention may also contain various additives capable of imparting specific properties to the articles the blends are intended to produce. Additives known to those skilled in the art that may be used in these blends include, but are not necessarily limited to, fillers such as talc and calcium carbonate, pigments, antioxidants, stabilizers, anti-corrosion agents, slip agents, and antiblock agents, etc.

It will also be appreciated that the resin blends of this invention may be co-extruded with other resins to form multilayer films. The resin blends herein may serve as the core layer or the skin layer, and in a particular non-limiting embodiment serve as the core layer, depending upon the expected application. The co-extrusion may be conducted according to methods well known in the art. Furthermore, the film or sheet materials of this invention may be laminated with other materials after extrusion as well. Again, known techniques in laminating sheets and films may be applied to form these laminates.

The invention will now be described further with respect to actual Examples that are intended simply to further illustrate the invention and not to limit it in any way.

Since the invention concerns blends, it is appropriate to state resin properties. The properties of 4180, 4280, and 4280W are provided in TABLE 1. Hopper blends were used to make both neat film and 4180/resin modifier film. The data for 4280 and 4280W are provided because they are higher melt flow impact copolymers and are used in some comparisons in the report. In the context of this invention, polymers designated as "barefoot" have no nucleating agents, slip additives, processing aids such as fluoroelastomers, or antiblock additives.

TABLE 1

Quality control data for 4180, 4280 and 4280W

| Material | 4180 | 4280 | 4280W |
|---|---|---|---|
| Melt Flow Rate (dg/min) | 0.80 | 1.3 | 1.3 |
| ASTM Flex. Mod. (kpsi) | 140 | 165 | 166 |
| ASTM Izod (ft-lbf/in) | 14.6 | 14.1 | 15.1 |
| Additives | Barefoot | Barefoot | Nucleated |

A wide range of resin modifiers was investigated (Table 2). All were blended with 4180 at loadings of 15 weight % (15%). The selection was based on the resins having low melting temperatures and a low to moderate melt flow rate or melt index. Although not listed in the Table, a third decisive factor was softness—all of the resins used have a lower modulus than 4180.

Two mil films were blown with no stalk (also commonly called "in the pocket", "no neck", or "LLDPE configuration") using a 2.5 BUR and a screw speed of 75 RPM. The processing conditions are listed in Table 3.

TABLE 3

Alpine Film Line Processing Conditions

| Temp. Set Points | |
|---|---|
| Zone 1, ° F. (° C.) | 370 (188) |
| Zone 2, ° F. (° C.) | 445 (299) |
| Zone 3, ° F. (° C.) | 445 (299) |
| Die 1, ° F. (° C.) | 445 (299) |
| Die 2, ° F. (° C.) | 445 (299) |
| Die 3, ° F. (° C.) | 445 (299) |
| Die Gap (mm) | 0.9 |
| Neck Height (in or cm) | 0 |
| Layflat, in (cm) | 18.6 (47.2) |
| Blow Up Ratio (BUR) | 2.5 |
| Film Thickness, mils (mm) | 2(0.05) |
| Extruder RPM | 75 |

Tafmer®, Finaplas® 1471, and the random copolymers all have higher melt flow rates than neat 4180. The blends

TABLE 2

Resin Modifier Data

| | Material | | | | | |
|---|---|---|---|---|---|---|
| | Tafmer ® XR110T | mRCP1 | EOD 94-21 | Finaplas ® 1471 | Exxon Exceed ™ 350D60 | Exxon Exact ™ 3125 |
| Description of the Material | Low Crystalline Copolymer of Propylene/α-olefin | Metallocene Random Copolymer | Ziegler-Natta Random Copolymer (ZNRCP) | Metallocene Syndiotactic Propylene Polymer (sPP) | Metallocene Linear Low Density Polyethylene | Metallocene Ethylene-based Butene Plastomer |
| MFR (dg/min) | 6.7[1] | 14.0[1] | 5.5[1] | 4.0[1] | N/A | N/A |
| MI2 (dg/min) | N/A | N/A | N/A | N/A | 1.0[2] | 1.2[2] |
| MI5 (dg/min) | N/A | N/A | N/A | N/A | N/A | 2.75[1] |
| HLMI (dg/min) | N/A | N/A | N/A | N/A | N/A | 16.7[1] |
| Melting Point (° C.) | 112[1] | 120[1] | 120[1] | 130[1] | 119[2] | 103[2] |

N/A = Not applicable or not available
[1]Source: ATOFINA
[2]Source: Product literature One comment about blending is needed before discussing the experimental results. Resin modifiers were added to 4180 by physical blending. The 4180 pellets and resin modifier pellets were poured into a cement mixer, tumbled together until well dispersed, and then transferred into an Alpine blown film line hopper. This makes what is commonly called a "salt and pepper" blend. No melt blending between materials was done prior to plastication in the Alpine extruder. The blown film line extruder was relied upon to convert the salt and pepper blend into a well-mixed melt with the resin modifier finely dispersed in the 4180 matrix. This processing method was chosen because simulates what a customer would do on their commercial blown film lines.

Unexpected Processing Advantages

Two mil (50 μm) thick films were made on an HDPE Alpine blown film line; a line designed for high molecular weight—high density polyethylene (HMW-HDPE). Since it is a small HMW-HDPE line, it has some limiting features for making PP blown films. One of these is having only a single lipped air ring.

should have a higher melt flow rate than 4180, assuming they follow log additive rule behavior (Equation 1). Using the log additive rule, select blend melt flow rates were predicted and found to lie between those of 4180 and 4280 (please see Table 4).

Equation 1. Log additivity rule for predicting blend MFR $$\log(MFR_b) = [w_1 \cdot \log(MFR_1) + w_2 \cdot \log(MFR_2)]$$

TABLE 4

Melt Flow Rates for 4180 and 4280 and Predicted Melt Flow Rates for Some Blends

| | MFR (dg/min) |
|---|---|
| 4180 | 0.80 |
| 4280 | 1.24 |

| | Predicted MFR (dg/min) |
|---|---|
| 4180/Tafmer (85/15) | 1.10 |
| 4180/mRCP1 (85/15) | 1.22 |

TABLE 4-continued

Melt Flow Rates for 4180 and 4280 and
Predicted Melt Flow Rates for Some Blends

| | |
|---|---|
| 4180/EOD 94-21 (85/15) | 1.07 |
| 4180/Finaplas 1471 (85/15) | 1.02 |

Figure 1:
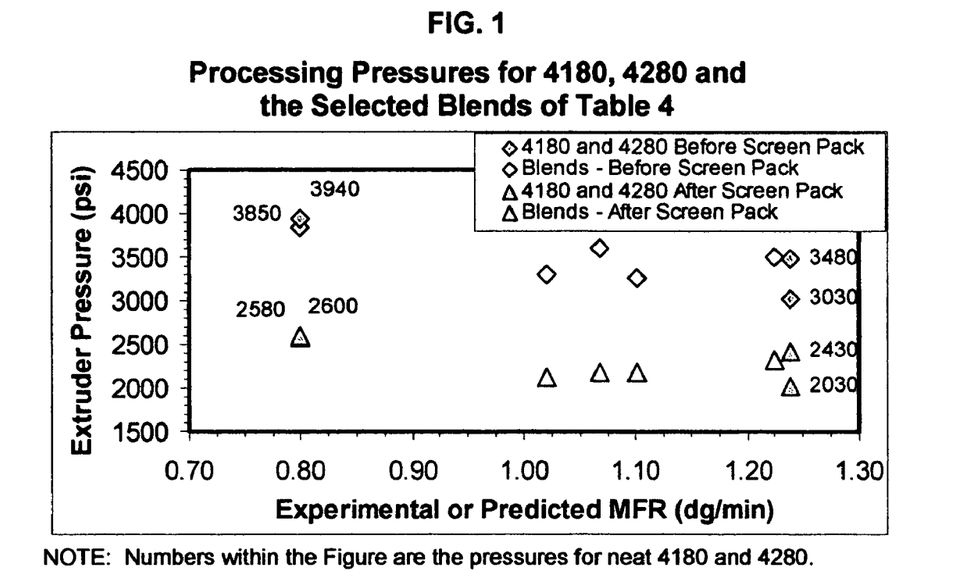
FIG. 1 is a plot of extruder processing pressures for 4180, 4280 and the selected resin blends listed in Table 4 as a function of experimental or predicted MFR (dg/min), where the numbers within FIG. 1 are the pressures for neat 4180 and 4280.

Given the predicted MFRs of some blends, a reduction in processing pressure was expected. This expectation was realized, as seen in FIG. 1. All of the blends processed at lower pressures than neat 4180. The lower processing pressure is advantageous for processing lines that are pressure limited.

Adding some resin modifiers lowered pressure. This point is illustrated by comparing the pressures of 4180 and 4280 to those of the blends, as seen in FIG. 1. Therefore, using resin modifiers to reduce pressures is helpful.

Processing advantages may be manifested in lower motor drive amps on the extruder screw (reduced power requirements). The resin modifiers can modify the way solid pellets are conveyed in the screw and/or how the pellets and melt are pushed through the extruder. The net effect can be an unexpected improvement—the resin modifiers can make it easier for the extruder motor to push the pellets and melt through the equipment. The amperage drawn by the motor quantifies this improvement.

Figure 2:
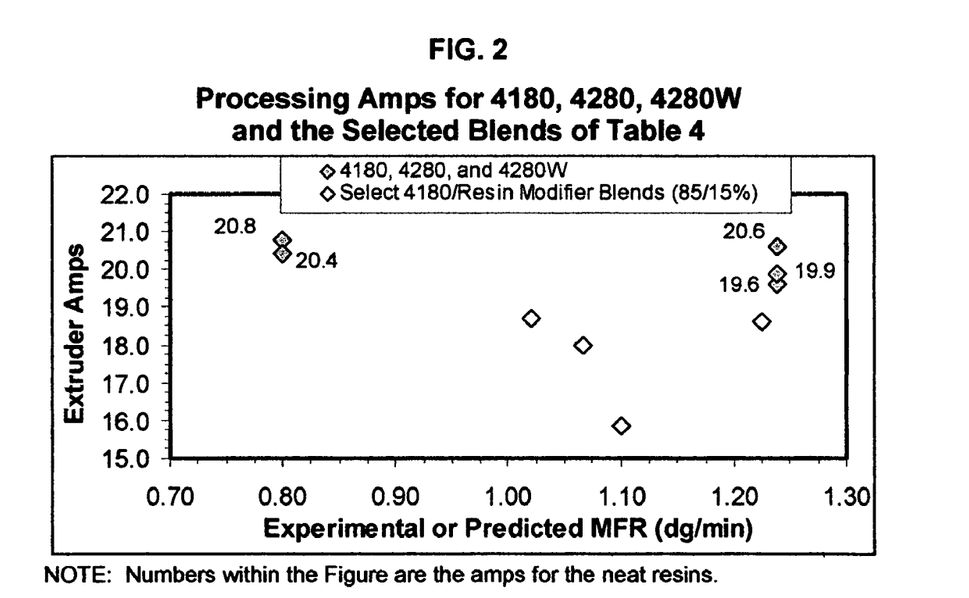
FIG. 2 is a plot of extruder processing amperages for 4180, 4280, 4280 W and the selected resin blends listed in Table 4 as a function of experimental or predicted MFR (dg/min), where the numbers within FIG. 1 are the pressures for the neat resins.

It was unexpectedly discovered that adding certain resin modifiers significantly lowered the processing amps. As shown in FIG. 2, the processing amps for 4180, 4280, and 4280W lie in a tight range of 20.8 to 19.6. Adding 15% of some resin modifiers produces tangible benefits: Finaplas® 1471 lowers motor amps to 18.7, mRCP1 lowers it to 18.6, EOD 94-21 reduces the amps to 18.0, and Tafmer® decreases the motor amps to a mere 15.9. These are all significant reductions in the energy required to process and place the extruder motor under less stress, improving equipment reliability and service life. They constitute an unanticipated and synergistic processing improvement.

Two Mil (50 μm) Film Properties

Figure 3:
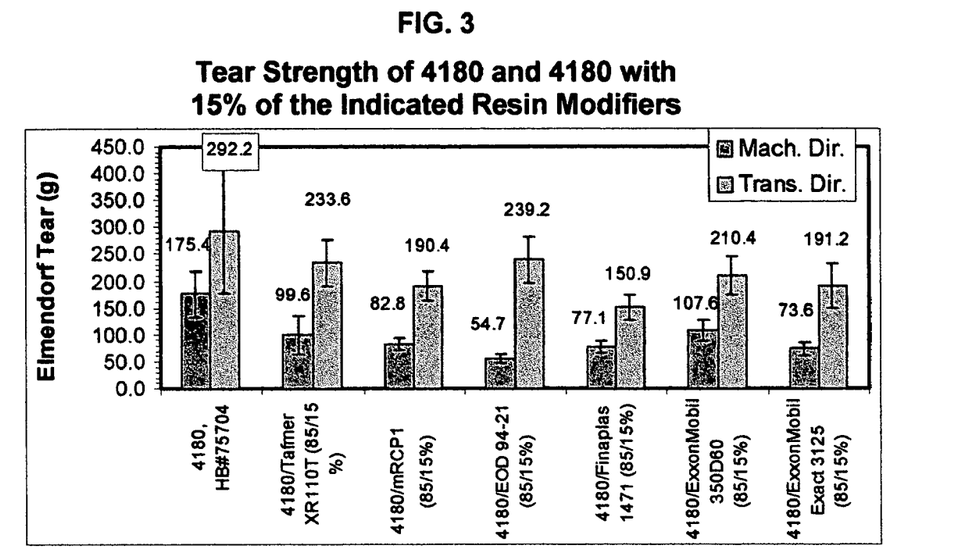
FIG. 3 is a graph of the measured Elmendorf Tear Strength (g) of neat 4180 resin as compared with 4180 blended with 15% of the indicated resin modifiers for both the machine direction (MD) and transverse direction (TD)

The blends consistently had equal or worse tear strength than neat 4180, as seen in FIG. 3. Only the Tafmer® blend has a machine direction (MD) tear strength equal to neat 4180 within the experimental error. However, all of the blends except the Finaplas® 1471 blend have TD tear strengths matching that of 4180 (again, within the standard deviations). The reduction in tear strength is modest considering the way the blends were made. Using salt-and-pepper blends on the Alpine blown film line does not insure good mixing. Better mixing, use of compatibilizers, and optimization of processing conditions could further improve the blend films' tear properties.

The experimental results shown in FIG. 3 are conditional; some important observations were made that are not captured in the data. When films containing ExxonMobil Exceed™ 350D6 were tested, occasionally the TD direction would not tear at all. This test result was found in 3 out of 13 samples tested. The blend containing Tafmer® XR110 T occasionally had some transverse direction tear readings 2 to 3 times the average. These values were considered aberrations and discarded in the analysis but actually indicate sporadic tear strength significantly above the reported value.

The blend tear results have implications for coextruded structures. Poor interfacial adhesion between 4180 matrix and dispersed resin modifier can lead to stress concentrators at the interface, reducing tear strength. Coextruded structures would overcome this limitation, particularly if a tie layer is used to bind the two materials. Given the modest loss in tear strength with the blends, it may be that many coextruded structures based on these formulations would have tear strengths exceeding that of neat 4180.

Interesting results were found in dart drop testing, which is a measure of fast impact puncture strength. The blends containing random copolymers and Tafmer were substantially stronger than the neat 4180 film, please see the high-lighted values in Table 5. This result could be greatly valued by film customers, which tend to be sensitive to dart impact strength. For example, dart drop testing is a key evaluation criterion for HDPE bimodal blown films.

TABLE 5

Fast and Slow Puncture Properties

| Material | Dart Impact Strength (g) | Slow Puncture Max. Load | | Slow Puncture Total NRG | | Slow Puncture Force @ Break | | Slow Puncture Elong. @ Break | |
|---|---|---|---|---|---|---|---|---|---|
| | | (lbf) | (N) | (in-lb) | (J) | (lb) | (N) | (in) | (cm) |
| 4180 | 316.1 | 5.82 (±0.46) | 25.9 | 3.71 (±0.29) | 60.4 | 5.25 (±0.43) | 23.3 | 0.96 (±0.03) | 2.4 |
| 4180/Tafmer ® (85/15%) | 391.1 | 4.61 (±0.16) | 20.5 | 2.49 (±0.17) | 40.5 | 4.33 (±0.14) | 19.3 | 0.82 (±0.04) | 2.1 |
| 4180/mRCP1 (85/15%) | 377.5 | 5.00 (±0.57) | 22.2 | 2.49 (±0.17) | 40.5 | 4.84 (±0.56) | 21.5 | 0.76 (±0.06) | 1.9 |
| 4180/EOD 94-21 (85/15%) | 391.0 | 5.37 (±0.24) | 23.9 | 2.81 (±0.20) | 45.7 | 5.01 (±0.26) | 22.3 | 0.79 (±0.03) | 2.0 |
| 4180/Finaplas ® 1471 (85/15%) | 247.0 | 4.97 (±0.06) | 22.1 | 2.70 (±0.20) | 43.9 | 4.63 (±0.05) | 20.6 | 0.82 (±0.05) | 2.1 |
| 4180/ExxonMobil Exceed™ 350D60 (85/15%) | 299.5 | 5.08 (±0.10) | 22.6 | 2.53 (±0.08) | 41.2 | 4.85 (±0.14) | 21.6 | 0.77 (±0.01) | 2.0 |
| 4180/ExxonMobil Exact™ 3125 (85/15%) | 324.4 | 4.79 (±0.09) | 21.3 | 2.28 (±0.08) | 37.1 | 4.59 (±0.07) | 20.4 | 0.74 (±0.01) | 1.9 |

Note:
Standard deviations are given in parentheses.

The improvement in fast puncture strength did not persist in slow puncture strength. Relative to neat 4180, the blends consistently had equal or worse values for maximum load, total energy, force at break, and elongation at break, as seen in Table 5. However, relative to polyethylene films these data are still competitive. The blend properties consistently exceed those of commercial unimodal polyethylene films. Slow puncture properties between neat 4180 and commercial polyethylene films is satisfactory for many commercial applications.

Figure 4:
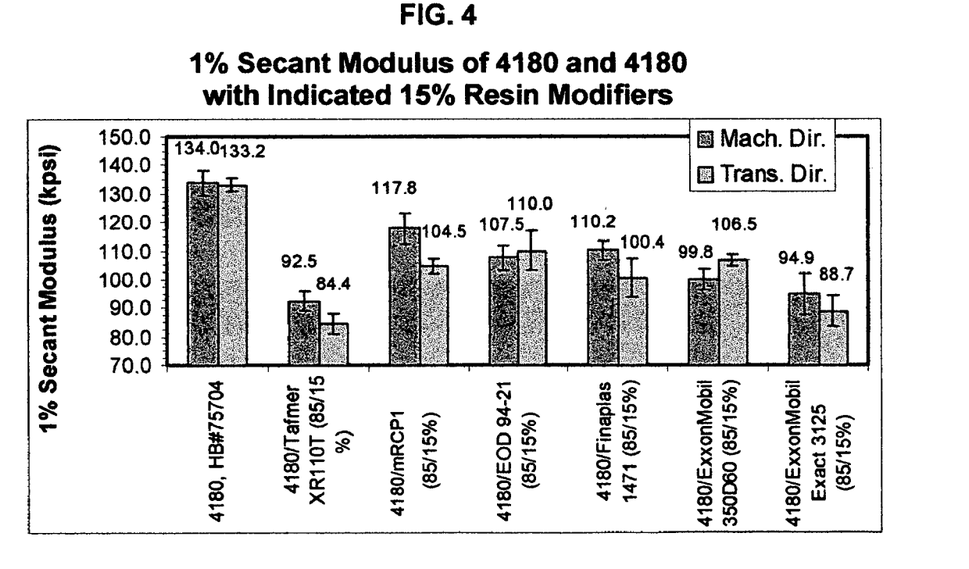
FIG. 4 is a graph of the 1% secant modulus of neat 4180 and 4180 with 15% of the indicated resin modifiers for both MD and TD.

It was discovered that the inclusion of 15% resin modifier consistently succeeded in lowering the film stiffness, as seen in FIG. 4. The most dramatic results were obtained with Tafmer® XR110 T and Exact™ 3125. Increased softness is valued in many film applications. Reducing the secant modulus through blending with a resin modifier achieves that goal.

Figure 5:
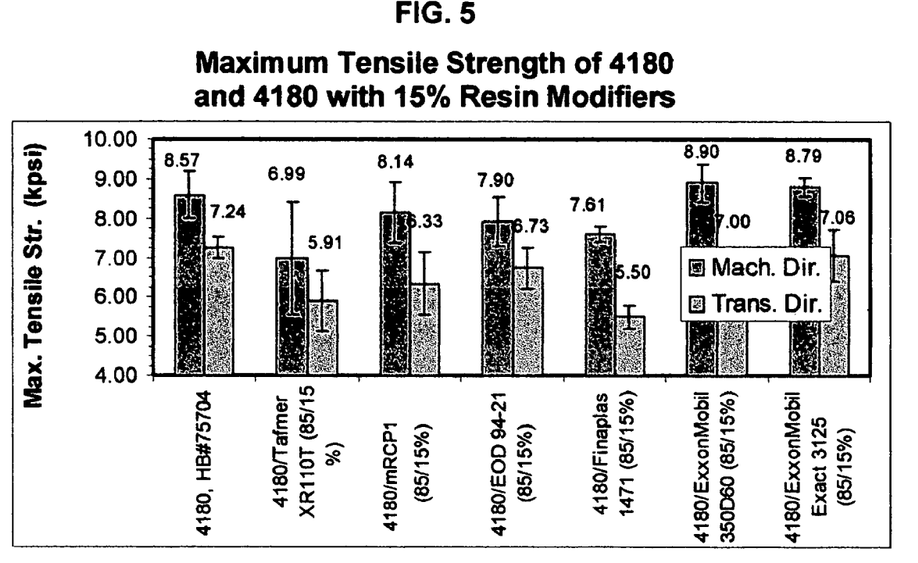
FIG. 5 is a graph of the maximum tensile strength (kpsi) of neat 4180 and 4180 with 15% of the indicated resin modifiers for both MD and TD.

Blend tensile strengths were generally unremarkable—they were all equal to or lower than that of neat 4180. The best blend tensile strengths were achieved with mRCP1, EOD 94-21, ExxonMobil Exceed™ 350D6, and Exact™ 3125, as seen in FIG. 5. These blends produced films with the same maximum tensile strength as neat 4180. Using Tafmer® XR110 T and sPP both lowered the maximum tensile strength significantly.

Figure 6:
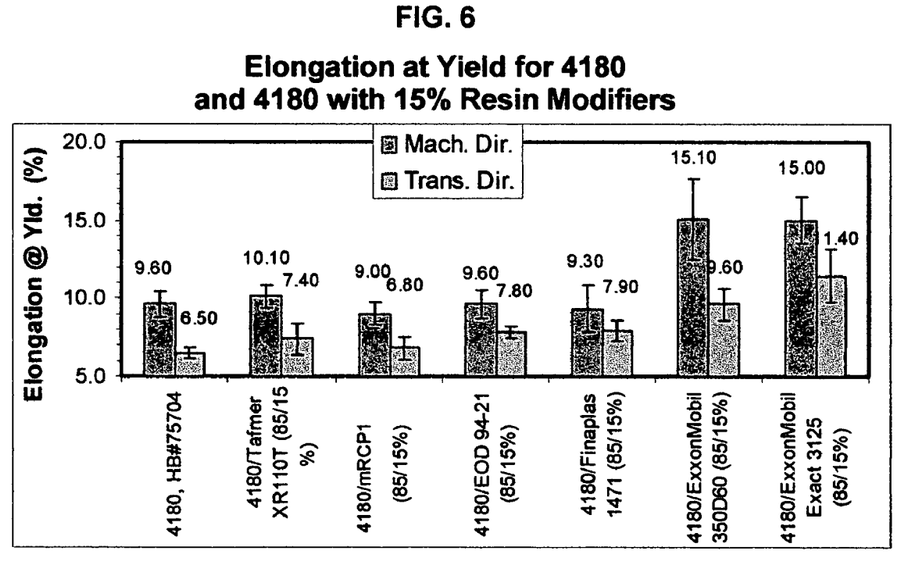
FIG. 6 is a graph of the elongation at yield (%) of neat 4180 and 4180 with 15% of the indicated resin modifiers for both MD and TD.

Elongation at yield is an important film attribute because it describes how much deformation a film can withstand before significant irrecoverable stretching occurs. Some blends have more "give" than neat 4180. The most exceptional were blends containing ExxonMobil Exceed™ 350D6 and ExxonMobil Exact™ 3125, the data for which are presented in FIG. 6. These had elongation to yield values that exceeded those of 4180 in both the machine and transverse directions. Lesser improvements were achieved with EOD 94-21 and Finaplas 1471, which both had higher transverse direction yields than neat 4180.

An important feature for some applications is stress whitening when the film is folded. Folding neat 4180 causes it to stress whiten at the crease. This effect is undesirable but can be lessened or eliminated with the use of some resin modifiers. The best results were obtained when LLDPE and plastomer were Surface roughness and coefficient of friction (COF) are important properties in the film industry and an area that the blend films may exhibit useful characteristics. Specifically, smoother surfaces can help when applying a coating to the film surface, such as in metallization. A rough surface during metallization creates localized areas with poor coating, increasing film permeability above desired values. Control of surface roughness can be critical for converting equipment, where the outside surface may need a high coefficient of friction for adequate traction during converting while the inside surface may need to be smoother to allow an article to slip easily into a formed package. A surface that is very smooth can lead to problems with surface layers sticking together. This problem is called "blocking" and great effort is made to avoid this situation. Therefore, there are optimal levels of surface smoothness and COF for films depending on the application and location (outside versus inside surface).

It is expected that the use of some resin modifiers within the scope of this invention allows the films to be significantly smoother and lowers the coefficient of friction, see Table 8.

TABLE 8

Blown Film COF

| Material | Dynamic COF Inside/inside |
|---|---|
| 4180 | 0.74 |
| 4180/ExxonMobil Exceed™ 350D60 (85/15%) | 0.55 |
| 4180/ExxonMobil Exact™ 3125 (85/15%) | 0.56 |

Differential scanning calorimeter (DSC) data were generated on all films. It is important to mention that a couple of melting and recrystallization peaks were observed with the polyethylene blends (Exceed™ and Exact™), used, as shown in Table 6. Films containing these two materials had no stress whitening. For applications that can tolerate moderate amounts of stress whitening, Tafmer and Finaplas 1471 were found to be acceptable.

TABLE 6

Visual Assessment of Stress Whitening in Folded Films

| Material | Stress Whitening |
|---|---|
| 4180 | Yes |
| 4180/Tafmer® XR110T (85/15%) | Some |
| 4180/mRCP1 (85/15%) | Yes |
| 4180/EOD 94-21 (85/15%) | Yes |
| 4180/Finaplas® 1471 (85/15%) | Some |
| 4180/ExxonMobil Exceed™ 350D60 (85/15%) | None |
| 4180/ExxonMobil Exact™ 3125 (85/15%) | None |

Film haze and gloss were improved over those of neat 4180 in some blends, as seen in Table 7. The improvement was visually apparent in blends containing LLDPE and plastomer. The remaining blends also exhibited less haze and better gloss, but these improvements are marginal.

TABLE 7

Blown Film Haze and Gloss

| Material | Haze (%) | Gloss (45°) |
|---|---|---|
| 4180 | 80 | 4 |
| 4180/Tafmer® XR110T (85/15%) | 74 | 8 |
| 4180/mRCP1 (85/15%) | 76 | 7 |
| 4180/EOD 94-21 (85/15%) | 72 | 6 |
| 4180/Finaplas® 1471 (85/15%) | 72 | 8 |
| 4180/ExxonMobil Exceed™ 350D60 (85/15%) | 56 | 11 |
| 4180/ExxonMobil Exact™ 3125 (85/15%) | 56 | 11 | where all the other blends showed a single melting and recrystallization peak, as seen in Table 9.

TABLE 9

Melting and Recrystallization Peaks

| DSC, film | 4180 (100) | 4180/ Tafmer® (85/15) | 4180/mRCP 1 (85/15) | 4180/ Finaplas® 1471 (85/15) | 4180/ EOD94-21(85/15) | 4180/ Exceed™ mLLDPE (85/15) | 4180/ Exact™ plastomer (85/15) |
|---|---|---|---|---|---|---|---|
| Melt peak(s), °C. | 162 | 161 | 161 | 161 | 159 | 117, 163 | 107, 162 |

TABLE 9-continued

Melting and Recrystallization Peaks

| DSC, film | 4180 (100) | 4180/ Tafmer ® (85/15) | 4180/mRCP 1 (85/15) | 4180/ Finaplas ® 1471 (85/15) | 4180/ EOD94- 21(85/15) | 4180/ Exceed ™ mLLDPE (85/15) | 4180/ Exact ™ plastomer (85/15) |
|---|---|---|---|---|---|---|---|
| Recrystallization peak(s), ° C. | 116 | 110 | 111 | 112 | 111 | 100, 117 | 91, 112 |

Blends of ICP and MDPE

The results of a blend study using Finathene® HL 328 MDPE and ATOFINA 4180 polypropylene are presented. As noted, 4180 is a fractional melt flow impact copolymer (ICP) produced with a Ziegler-Natta catalyst. The melt flow rate of 4180 is 0.80 dg/min and its density is ~0.905 gr/cm$^3$. HL 328 is a medium density polyethylene whose melt index is ~0.28, and density of 0.937 gr/cm$^3$.

Figure 7:
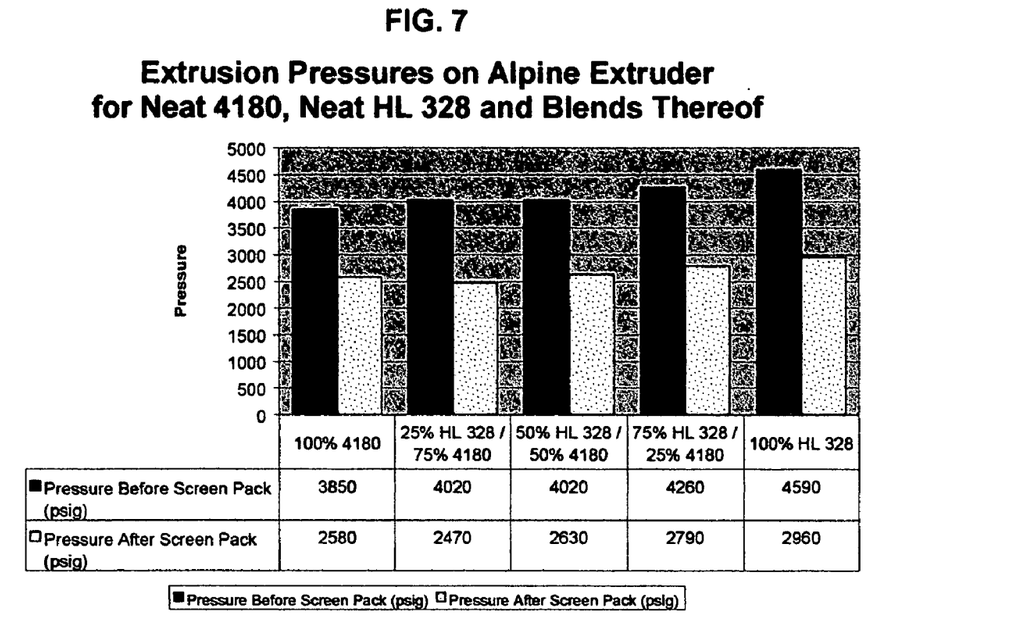
FIG. 7 is a chart of the extrusion pressures on an Alpine extruder running at 75 rpm for neat 4180 and HL 328 and blends thereof.

Pellet blends at 75/25, 50/50, 25/75 of HL328/4180 were processed on the Alpine line at 75 rpm and 2.5 BUR to produce 2.0 mil films, as before. Pure HL 328 and 4180 were also processed for comparison purposes. The extrusion temperature profile used was the same as that presented in Table 3. Such extrusion profile is that typically used for 4180 resin. The melt temperature of neat 4180 was 480° F. (249° C.) while that of neat HL 328 was 470° F. (243° C.). FIG. 7 presents the extrusion pressures observed on the Alpine at the experimental conditions used for the study. The extrusion pressure of HL 328 was 31.7 MPa (~4600 psi) while that of 4180 was 26.2 MPa (3800 psi). Approximately 5.5 MPa (800 psi) of increase in pressure was observed from 100% 4180 to 100% HL 328. The same motor amperes (~20) were observed for all of the samples. It is important to mention that excellent blown film processing was possible for all the blends.

Figure 8:
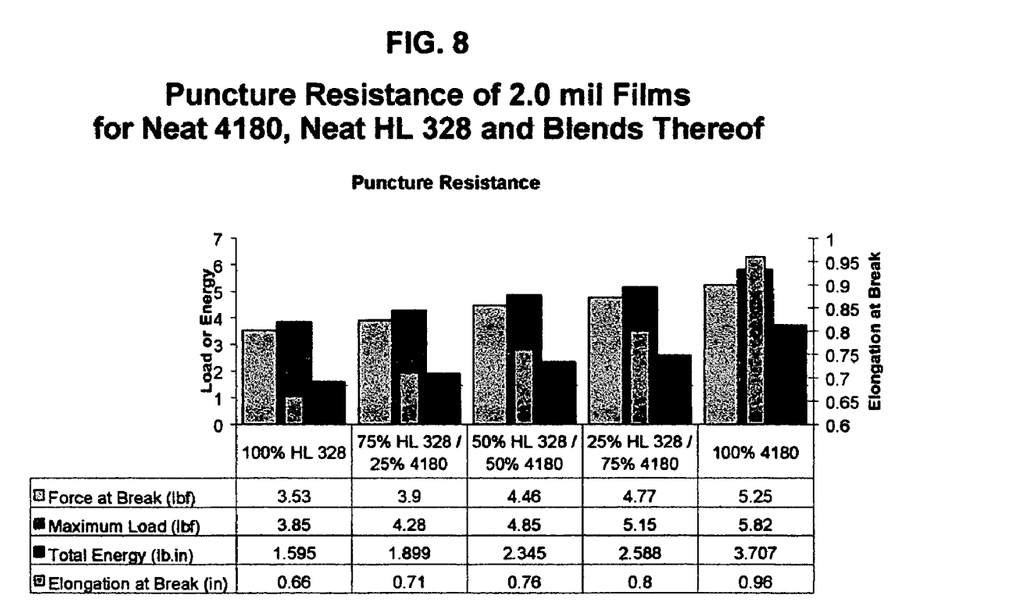
FIG. 8 is a chart of the puncture resistance for the 2.0 ml films made from neat 4180, neat HL 328 and blends thereof.

FIG. 8 provides the results from the puncture resistance tests conducted for the 2 mils films produced on the Alpine. In general, it may be seen that the incorporation of 4180 in HL 328 increases the puncture resistance. Specifically, the elongation at break increased ~0.3% per every % wt. of 4180 added, the force at break and the maximum load increased by ~0.45% per every % wt. of 4180 added, and the total energy needed for puncture increased by ~1% per % wt. of 4180.

Figure 9:
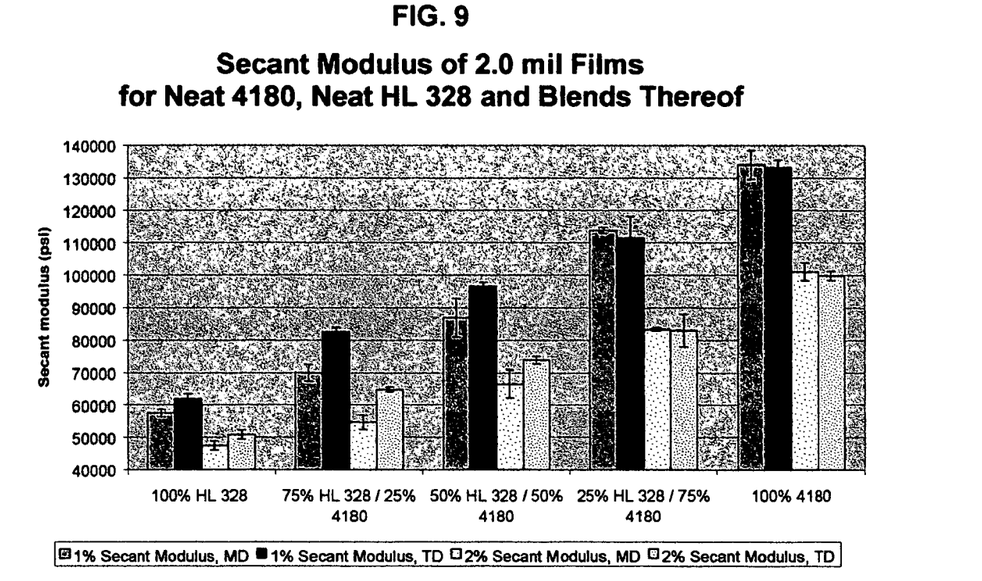
FIG. 9 is a chart of the secant modulus for the 2.0 ml films made from neat 4180, neat HL 328 and blends thereof.

FIG. 9 presents the secant modulus results for the films made on the Alpine. A stiffer film balanced in the machine and transverse directions is obtained as the amount of 4180 ICP increases. At the conditions tested, the increase in secant modulus doubles from neat HL 328 to neat 4180. The increase in puncture resistance and stiffness allows HL 328 to be further down gauged while maintaining the puncture resistance needed for the application. Examples of such applications could be heavy-duty shipping bags, stand-up pouches, general industrial packaging, geomembranes, etc.

Figure 10:
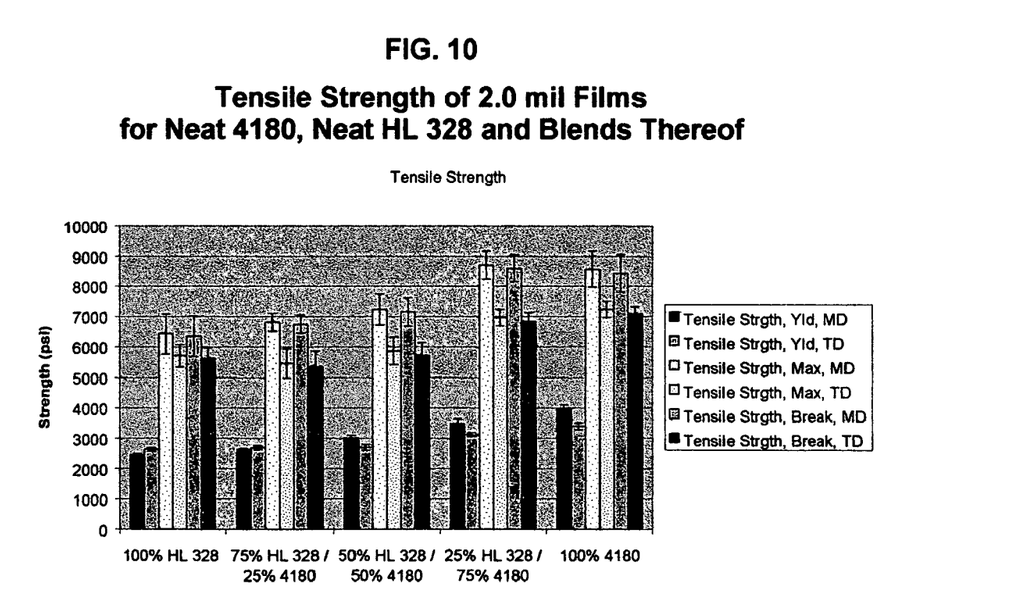
FIG. 10 is a chart of the tensile strength for the 2.0 ml films made from neat 4180, neat HL 328 and blends thereof.
Figure 11:
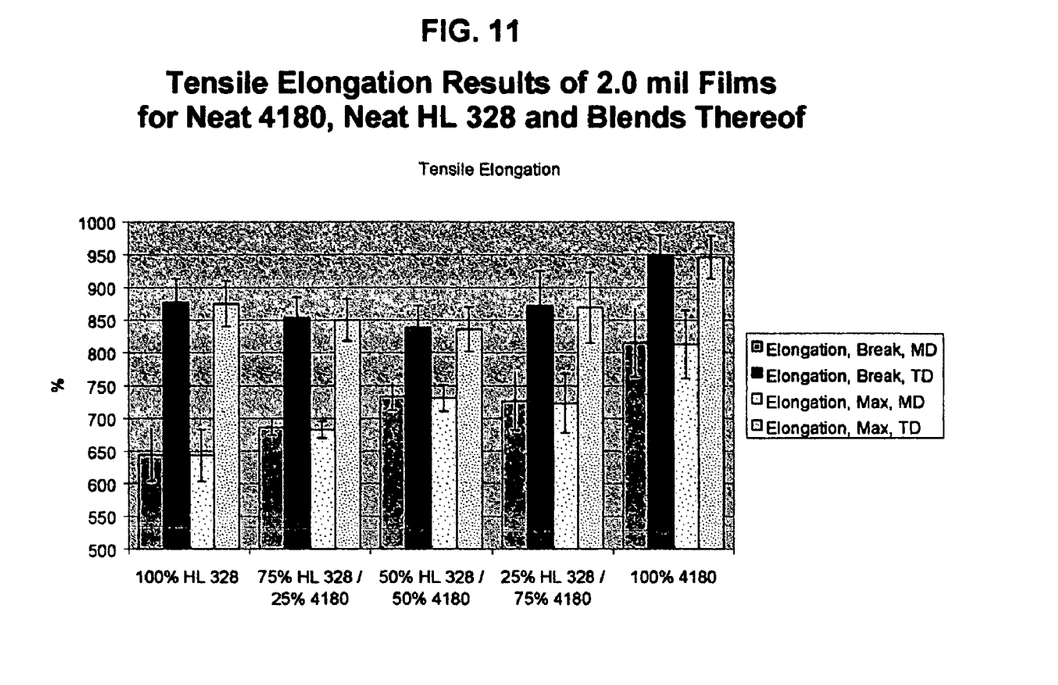
FIG. 11 is a chart of the tensile elongation results for the 2.0 ml films made from neat 4180, neat HL 328 and blends thereof.

FIG. 10 is a graph with the tensile strength results for the HL 328/4180 films. In general the tensile strength of the film increases as the content of 4180 increases. A very interesting result was obtained for the 25% blends for which the tensile strength of the neat resins seems not to be affected. FIG. 11 presents the elongation results obtained from the same tensile tests. As the amount of 4180 increases, the film elongates more at the maximum strength. Although the differences observed in elongation at break are small, it seems to achieve a minimum at 50% wt.

Figure 12:
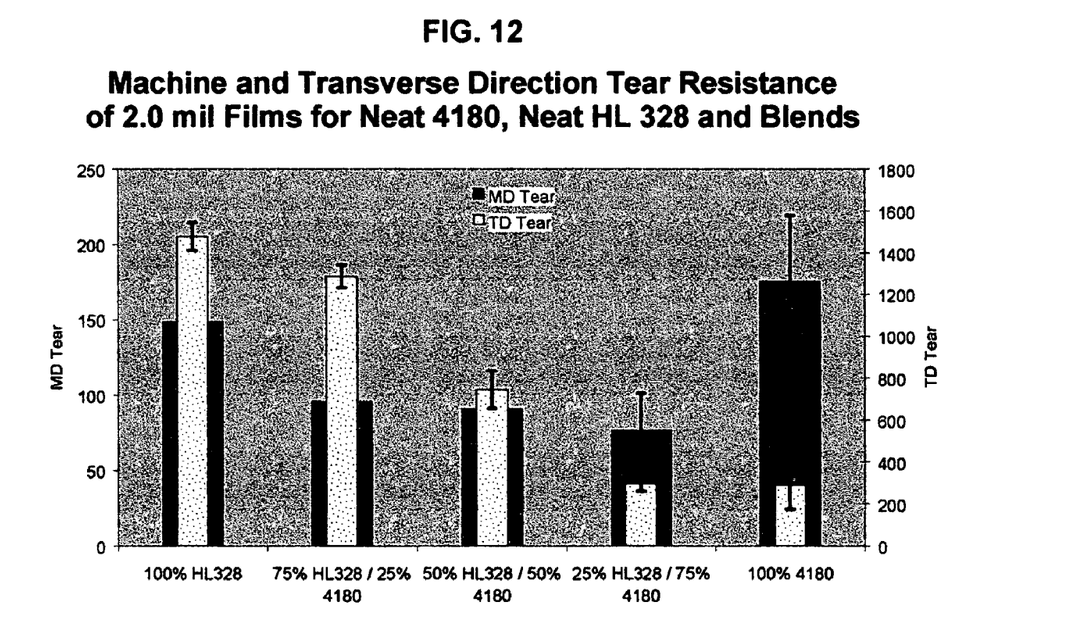
FIG. 12 is a chart of the machine and transverse direction tear resistance measurements for the 2.0 ml films made from neat 4180, neat HL 328 and blends thereof.
Figure 13:
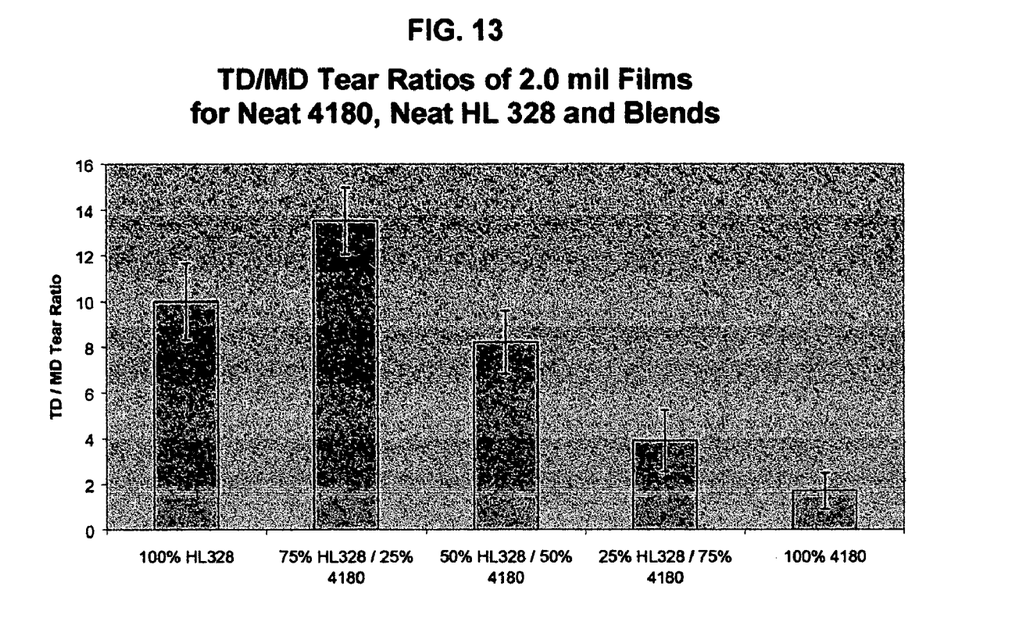
FIG. 13 is a chart of the TD/MD ratios for the 2.0 ml films made from neat 4180, neat HL 328 and blends thereof.

FIG. 12 plots the machine and transverse direction tear of the blend films produced on the Alpine. The transverse direction tear strength of 4180 is ~300 gr while that of HL 328 is ~1400 gr. Intermediate TD tears were obtained for the film blends. On the other hand, considering the standard deviation of the test results the machine direction tear strength of 4180 and HL 328 are similar (around 175 gr). The same MD tear was obtained for the film blends, regardless of their HL 328/4180 content, but unexpectedly, the MD tear seems lower as compared to the neat films. FIG. 13 plots the TD/MD tear ratio obtained from the tear tests. The 75% HL 328/25% 4180 blend film presented a higher tear ratio than HL 328. As expected for the remaining blend films, the TD/MD tear ratio decreased as the content of 4180 increased.

Figure 14:
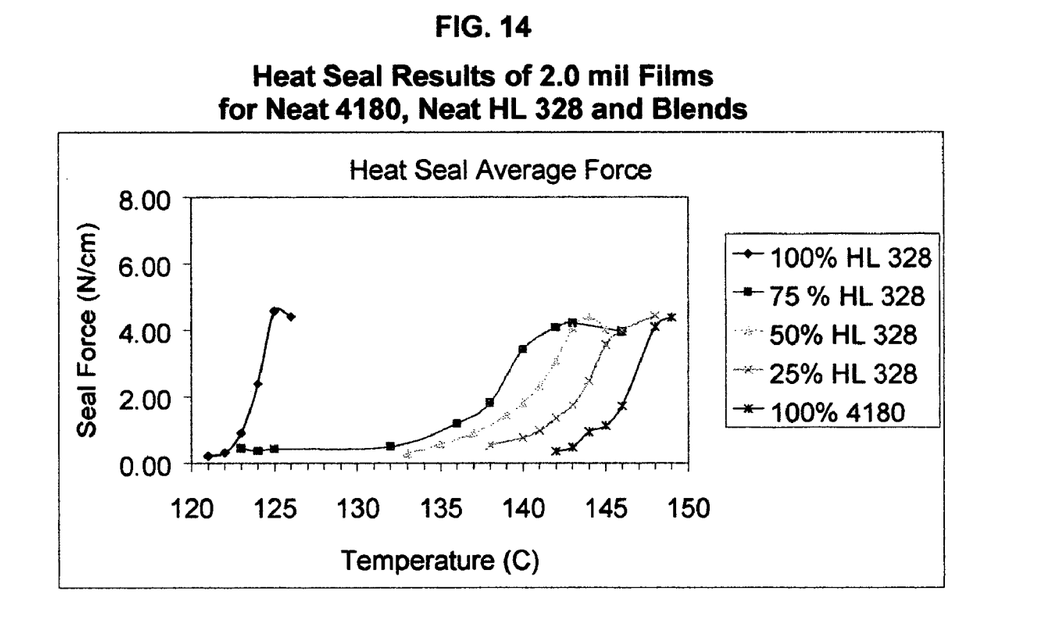
FIG. 14 is a graph of the heat seal results for the 2.0 ml films made from neat 4180, neat HL 328 and blends thereof.
Figure 15:
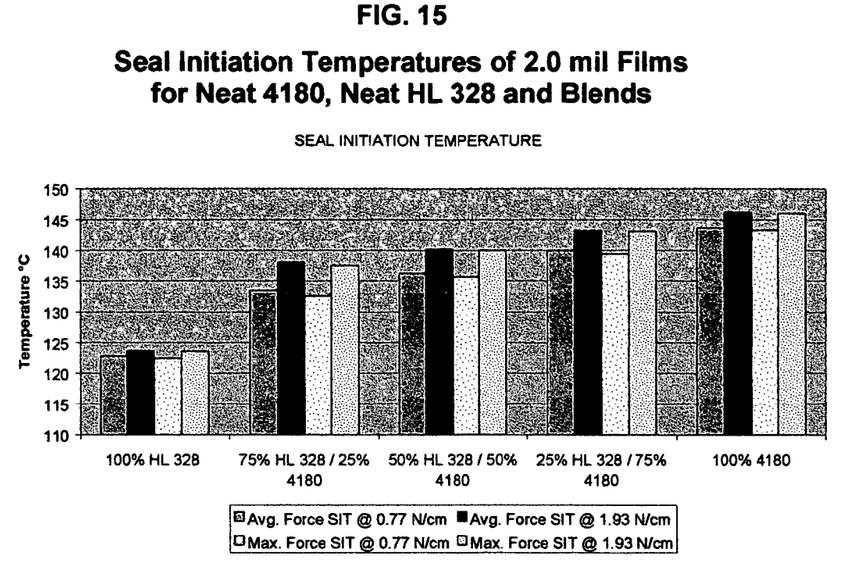
FIG. 15 is a chart of the seal initiation temperatures for the 2.0 ml films made from neat 4180, neat HL 328 and blends thereof.
Figure 16:
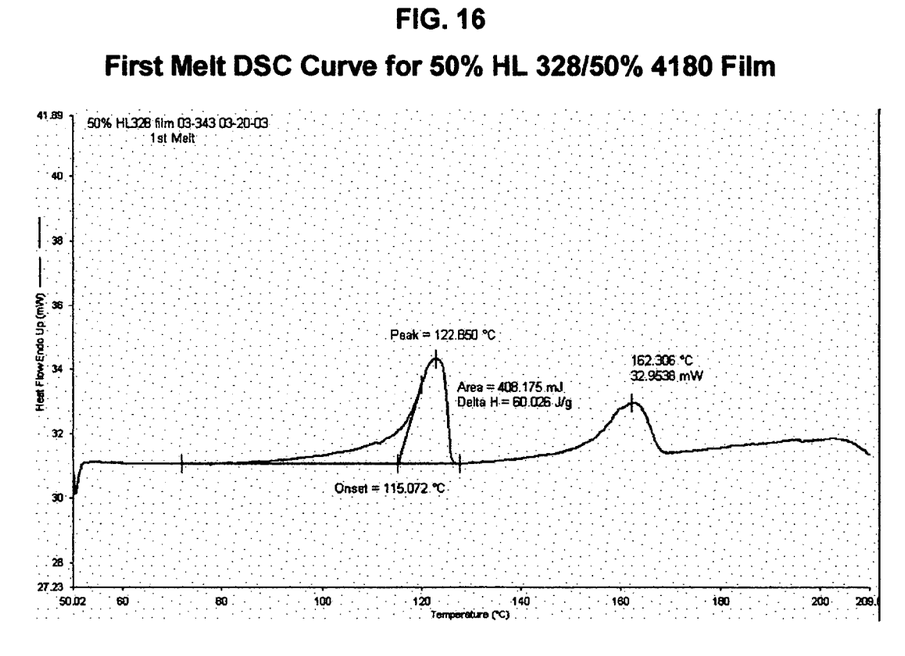
FIG. 16 is a graph of the first melt DSC curve for a film blended from 50% HL 328 and 50% 4180.

FIG. 14 and FIG. 15 present the heat seal curves and seal initiation temperatures (SIT), respectively. Surprisingly, no change in the seal force was observed between 4180 and HL 328. However, due to the higher melting point of 4180, the seal initiation temperatures increased from ~125° C. to ~145° C. The first 10° C. increase observed in SIT was obtained when 25% of 4180 was added. Table 10 presents the first melt DSC data obtained for the film blends produced on the Alpine. A second melting peak corresponding to the 4180 became apparent between 162–164° C. for the blend films. A somewhat lower heat seal temperature as compared with an identical material absent the presence of MDPE is possible, and the blend material is still suitable for use in objects that are sterilized in autoclaves. FIG. 16 presents the first melt DSC curve of the 50/50 blend film. The lower temperature peak is that of HL 328 and the second one corresponds to the 4180 resin.

TABLE 10

First Melt DSC Results for the Films Produced with HL 328/4180

| % HL 328 | Melt Peak, ° C. | ΔH*, J/gr |
|---|---|---|
| HL328 (100%) | 124 | 130 |
| HL328/4180 (75/25%) | 124, 162 | 96 |
| HL328/4180 (50/50%) | 123, 162 | 60 |
| HL328/4180 (25/75%) | 123, 164 | 27 |
| 4180 (100%) | 164 | — |

*Melting enthalpy (ΔH) in this Table is for the HL328 portion of the DSC trace only and does not include the ΔH for the 4180 component in the blends. Melting enthalpy for 100% 4180 was 65.38 J/gr.

The following conclusions can be drawn from the study of the various blends of HL 328 and 4180:

It was possible to run pellet blends of HL 328 and 4180 on the Alpine without processing problems.

The use of 4180 ICP as a modifier of MDPE improved the slow puncture resistance by ~0.45% per every % wt. of 4180 added.

The stiffness of the film as measured by the secant modulus almost doubled from neat HL 328 to neat 4180.

The tensile strength of the film seems not to be affected when using less than 25% wt. of either product and an intermediate strength is obtained with a 50% blend.

No change in the seal force was observed among the film blends. However, the seal initiation temperatures increased from ~125° C. (for neat HL 328) to ~145° C. (for neat 4180). The main increase observed in SIT was obtained when 25% of 4180 was added. HL 328 could be used as a modifier of 4180 to decrease the SIT without affecting the final seal strength.

In the foregoing specification, the invention has been described with reference to specific embodiments thereof, and has been demonstrated as effective in providing methods for preparing blown films having improved properties. However, it will be evident that various modifications and changes can be made thereto without departing from the scope of the invention as set forth in the appended claims. Accordingly, the specification is to be regarded in an illustrative rather than a restrictive sense. For example, specific combinations or proportions of polymers and other components falling within the claimed parameters, but not specifically identified or tried in a particular polymer blend formulation, are anticipated and expected to be within the scope of this invention. Further, the methods of the invention are expected to work at other conditions, particularly extrusion and blowing conditions, than those exemplified herein.

TABLE 11

ASTM Film Test Methods Used in this Invention

| Property | ASTM Procedure |
|---|---|
| Tensile Strength, Elongation, Modulus | D882 |
| Haze | D1003 |
| Gloss | D2457 |
| Seal Testing | F88 |

GLOSSARY

1471 FINAPLAS® 1471 metallocene syndiotactic propylene polymer (sPP) having the characteristics noted in Table 2, available from ATOFINA Petrochemicals Inc.

350D60 Exceed™ 350D60 metallocene linear low density polyethylene having the characteristics noted in Table 2, available from ExxonMobil.

4180 ATOFINA® PP 4180 polypropylene; a fractional melt flow impact copolymer (ICP) produced with a Ziegler-Natta catalyst, available from Atofina Petrochemicals Inc.

EOD 94-21 A Ziegler-Natta random copolymer (RCP) having the characteristics noted in Table 2, available from Atofina Petrochemicals Inc.

Exact™ 3125 A metallocene ethylene-based butane plastomer having the characteristics noted in Table 2, available from ExxonMobil.

HL 328 FINATHENE® HL 328 MDPE; a medium density polyethylene produced with a chrome-type catalyst whose melt index is ~0.28, and density 0.937 gr/cm³.

mRCP1 A metallocene RCP having the characteristics noted in Table 2.

Tafmer TAFMER® XR110T low crystalline copolymer of propylene/α-olefin available from Mitsui Chemicals America, Inc.; see Table 2.

What is claimed is:

1. A film or sheet material comprising a blend of:
    at least one broad molecular weight distribution ethelene/propylene rubber impact-modified heterophasic copolymer (ICP), wherein the ICP has a polydispersity from about 4 to about 12, a melt flow rate from about 0.5 to about 5.0 dg/min and xylene solubles of about 25% or less; and
    from about 5 to about 95 wt % of at least one second polyolefin, where the second polyolefin is selected from the group consisting of a syndiotactic polypropylene (sPP), a medium density polyethylene (MDPE), a linear low density polyethylene (LLDPE), a low crystalline copolymer of propylene/α-olefin, and a random copolymer (RCP) of propylene and comonomer selected from the group consisting of ethylene and butenes, where the RCP is made using a Ziegler-Natta catalyst (ZNRCP) or a metallocene catalyst (mRCP).

2. The film or sheet material of claim 1 where the sPP has a melt flow rate from about 0.5 to about 100 dg/min, a melting point of about 90 to about 155° C. and a 1% secant modulus from about 5 to about 150 kpsi.

3. The film or sheet material of claim 1 where the RCP has a melt flow rate of from about 0.5 to about 100 dg/min, a melting point of about 105 to about 158° C. and a modulus from about 10 to about 150 kpsi.

4. The film or sheet material of claim 1 where the MDPE has a melt index ($MI_2$) of from about 0.1 to about 1.0 dg/min and a density of about 0.925 to about 0.939 gr/cm³.

5. The film or sheet material of claim where the LLDPE has a melt index ($MI_2$) of from about 0.1 to about 5 dg/min and a density of about 0.88 gr/cm³ to about 0.925 gr/cm³.

6. The film or sheet material of claim 1 where the second polyolefin low crystalline copolymer of propylene/α-olefin has a melt flow rate of from about 0.2 to about 20, a melting point from about 80 to about 150° C. and a density of about 0.88 to about 0.92 gr/cm³.

7. The film or sheet material of claim 1 where the second polyolefin is present in an amount from about 10 to 20 wt %.

8. The film or sheet material of claim 1 where the second polyolefin is selected from the group consisting of MDPE, low crystalline copolymer of propylene/α-olefin and metallocene ethylene-based butene plastomer.

9. The film or sheet material of claim 1 where the second polyolefin is selected from the group consisting of mLLDPE and metallocene ethylene-based butene plastomer.

10. The film or sheet material of claim 1 where the second polyolefin is selected from the group consisting of mLLDPE and metallocene ethylene-based butene plastomer.

11. The film or sheet material of claim 1 where the second polyolefin is MDPE and the material has a lowered heat seal temperature as compared with an identical material absent the MDPE, and is suitable for sterilization in autoclaves.

12. The film or sheet material of claim 1 where the second polyolefin is MDPE and the material has improved puncture resistance as compared with an identical material absent the ICP.

13. The film or sheet material of claim 1 where the second polyolefin is MDPE and the material has a lower seal initiation temperature as compared with an identical material absent the MDPE.

14. The film or sheet material of claim 1 where the second polyolefin is MDPE and the material has an altered transverse direction/machine direction tear ratio as compared with an identical material absent the MDPE.

15. The film or sheet material of claim 1 where the second polyolefin is LLDPE.

16. An impact copolymer resin blend comprising:
at least one broad molecular weight distribution ethylene/propylene rubber impact-modified heterophasic copolymer (ICP), wherein the ICP has a polydispersity from about 4 to about 12, a melt flow rate from about 0.5 to about 5.0 dg/min, and xylene solubles of about 25% or less; and
from about 5 to about 95 wt % of at least one second polyolefin, where the second polyolefin is selected from the group consisting of
a syndiotactic polypropylene (sPP),
a medium density polyethylene (MDPE),
a linear low density polyethylene (LLDPE),
low crystalline copolymer of propylene/α-olefin, and
a random copolymer (RCP) of propylene and comonomer selected from the group consisting of ethylene and butenes, where the RCP is using a Ziegler-Natta or metallocene catalyst.

17. The impact copolymer resin blend of claim 16 where the sPP has a melt flow rate from about 0.5 to about 100 dg/min, a melting point of about 90 to about 155° C. and a 1% secant modulus from about 5 to about 150 kpsi.

18. The impact copolymer resin blend of claim 16 where the RCP has a melt flow rate of from about 0.5 to about 100 dg/min, a melting point of about 105 to about 158° C. and a modulus from about 10 to about 150 kpsi.

19. The impact copolymer resin blend of claim 16 where the MDPE has a melt index ($MI_2$) of from about 0.1 to about 1.0 dg/min and a density of about 0.925 to about 0.939 gr/cm$^3$.

20. The impact copolymer resin blend of claim 16 where the LLDPE has a melt index ($MI_2$) of from about 0.1 to about 5 dg/min and a density of about 0.88 gr/cm$^3$ to about 0.925 gr/cm$^3$.

21. The impact copolymer resin blend of claim 16 where the low crystalline copolymer of propylene/α-olefin has a melt flow rate of from about 0.2 to about 20, a melting point from about 80 to about 150° C. and a density of about 0.88 to about 0.92 gr/cm$^3$.

22. The impact copolymer resin blend of claim 16 where the second polyolefin is present in an amount from about 10 to 20 wt %.

* * * * *